United States Patent [19]
George et al.

[11] 3,931,570
[45] Jan. 6, 1976

[54] APPARATUS FOR MEASURING CELL VOLUME IN A GRAVURE PRINTING SURFACE

[75] Inventors: Harvey F. George, West Hempstead; Robert H. Oppenheimer, Glen Cove; Charles G. Marrara, Franklin Square, all of N.Y.

[73] Assignee: Gravure Research Institute, Inc., Port Washington, N.Y.

[22] Filed: Sept. 19, 1974

[21] Appl. No.: 507,559

[52] U.S. Cl. .................. 324/34 R; 156/14; 156/18; 156/345
[51] Int. Cl.² ........................................ G01R 33/00
[58] Field of Search ............ 324/34 R, 34 PS, 34 D, 324/40; 156/14, 18, 345

[56] References Cited
FOREIGN PATENTS OR APPLICATIONS
1,540,970  10/1968  France.................... 324/34 PS OTHER PUBLICATIONS
McMaster et al., Magnetic Reaction Analyzer; ASME Publication No. 66–PEM–5; Feb., 1967; pp. 1–13.

*Primary Examiner*—Robert J. Corcoran
*Attorney, Agent, or Firm*—Morgan, Finnegan, Pine, Foley & Lee

[57] ABSTRACT

A method of and associated apparatus for measuring cell volume in a gravure printing surface including the steps of positioning a probe including a pair of magnetic reaction devices over an engraved area with one device over an area with cells and the other device over an area without cells, providing a magnetic field to be sensed by the magnetic reaction devices, sensing the relative reduction in the strength of the magnetic field due to the presence of non-ferrous metal to provide a differential signal proportional to cell volume, and conditioning and recording the differential signal, as desired.

16 Claims, 3 Drawing Figures

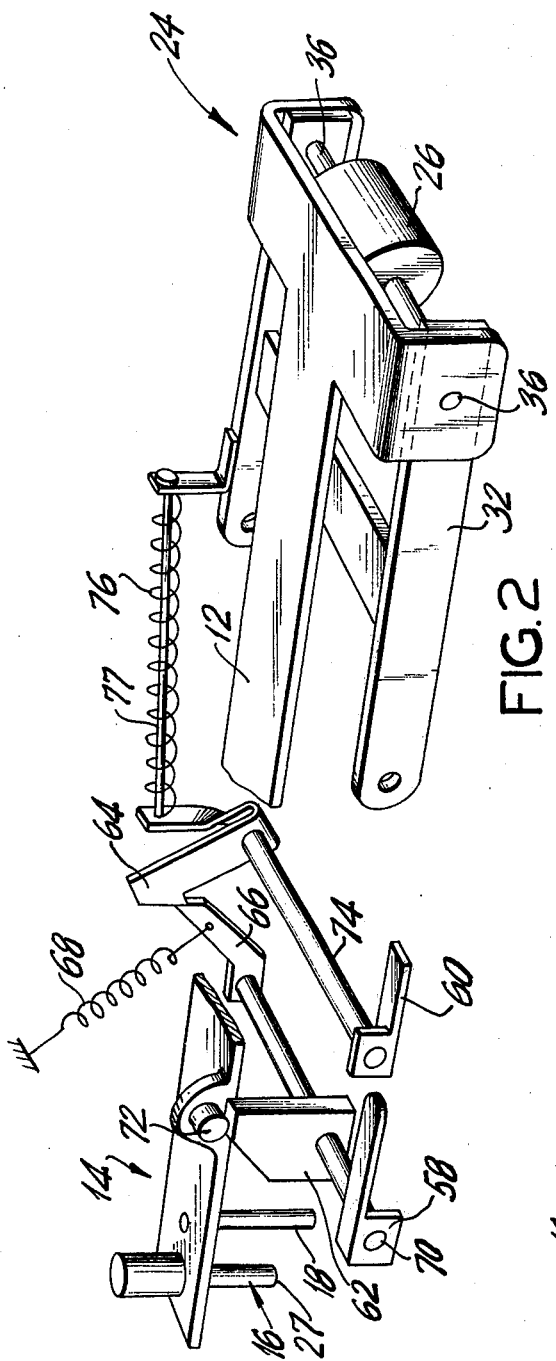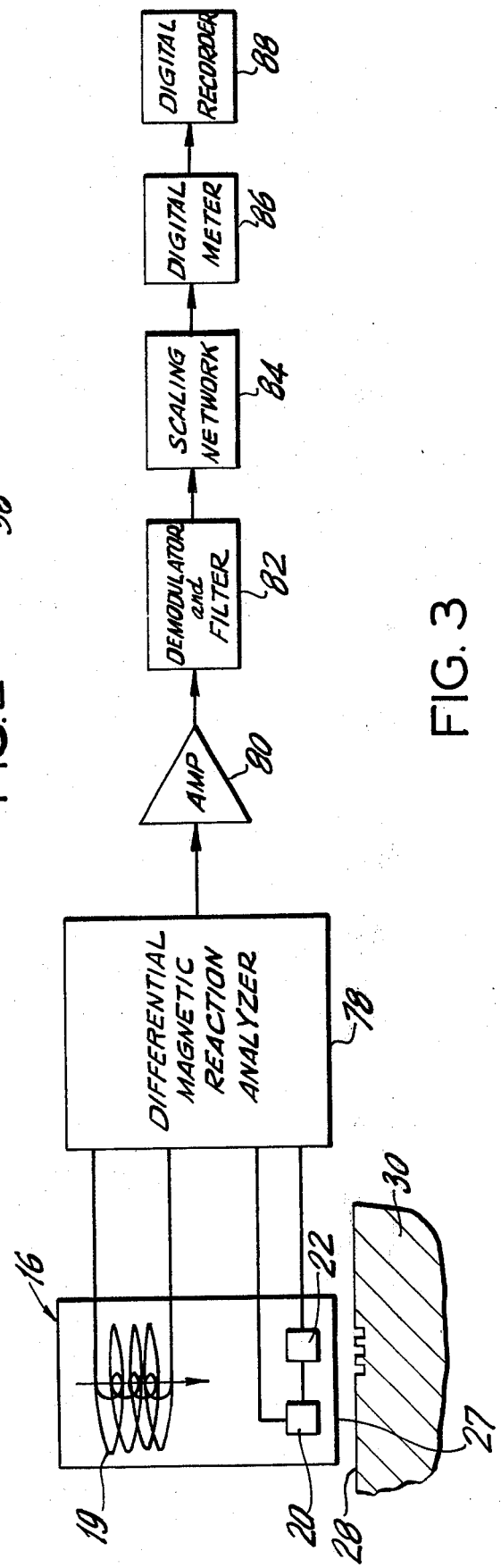

APPARATUS FOR MEASURING CELL VOLUME IN A GRAVURE PRINTING SURFACE

The present invention relates to gravure printing, and more specifically to a method and apparatus for measuring cell volume in a gravure cylinder or plate.

In gravure printing, the optical density of a given portion on the printed product (paper) depends upon the combined volume of the cells which have been chemically etched or mechanically engraved in a corresponding portion of the gravure cylinder or plate.

For a given screen size, i.e., a given number of cells per unit area, cells of small volume will result in a print-out of low density called a highlight, cells of intermediate volume will result in a print-out having medium density called a midtone, and cells of large volume will result in a print-out of high density called a shodow. Cells having very small volume may not print-out at all or very unreliably. Cells having an excessive volume may lead to spilling of ink beyond the borders of the engraved areas on the print, causing ink drying problems and excessive ink consumption. It is thus important to accurately control cell volume to achieve the desired print-out densities.

In order to be able to ascertain the accuracy of chemical etching and the validity of subsequent proofing operations, control patches are frequently etched along with the images into the gravure cylinder or plate. The control patches are small areas having cells with volumes corresponding either to highlights, midtones or shadows. These control patches are often located so that when the final printed product is cut to size, the printing resulting from the patches is trimmed away. Generally, after etching, the depths and in some cases the widths of the cells in these patches are measured with a gravure microscope.

In mechanical engraving, practiced with a gravure engraving machine such as the Helio-Klischograph manufactured by the firm, Dr. Ing. Rudolf Hell in Kiel, Germany, the cells are cut into the rotating cylinder by means of a vibrating stylus located in an engraving head. The depths and thus the volumes of the cells are controlled by moving the center of vibration of the stylus closer to or away from the cylinder surface.

An engraving machine may include a plurality of engraving heads, each of which requires periodic checking and adjustment. The circuits which control the styli also require periodic checking and adjustment. Such checks and adjustments are made by engraving patches corresponding to highlights, midtones and shadows either into a cylinder which is exclusively used for checking and adjustments, or into a cylinder which will be subsequently used in production printing. The width of the cells in the different patches are then measured with a gravure microscope and electrical and mechanical adjustments are made accordingly on the engraving machine.

Cell measurements made with a gravure microscope suffer from the following disadvantages:

1. When measuring the depth of etched cells, the microscope is first focused on the surface of the gravure cylinder and then focused on the bottom of the cell. The difference in the relative positions of the microscope barrel is read on a dial and taken to be the depth of the cell. It is difficult to determine exactly when the cylinder surface and cell bottom are in focus, so that the resulting determination of cell depth is quite subjective.

2. Microscopic cell measurements are limited to a very small number of cells which may not be representative of the average cell depth in the control patch.

3. It has been determined that print-out density is largely dependent upon the cell volume per unit area. Measurements of widths and depths of etched cells are only representative of cell volume for a given cell shape.

4. With mechanically engraved cells, cell width is only a measure of the cell volume per area if the cross sectional shape of the cutting stylus as well as the number of cells per unit area are known. Due to material and manufacturing imperfections, as well as wear, the stylus may deviate from its specified dimensions. With different cylinder diameters and different axial advances during rotation of the engraving heads on the cylinder, the number of cells per unit area can vary. To validate the relation of cell width to cell volume per unit area, these factors must be considered.

5. Microscopic cell measurements are tedious and time consuming, and at present represent a large portion of the time consumed to check and calibrate mechanical engravers.

Prior devices have employed a magnetic reaction device to control the etching process while etching is in progress. An initial reading of the gravure cylinder is taken before the etching process begins; this initial reading is stored in the memory of a computer. The initial reading is subtracted from subsequent readings taken during the etching process. During etching, the rotating cylinder is covered with a soft, fragile, gelatinous etching resist which cannot be disturbed, so that the magnetic reaction device cannot be located on the cylinder surface, but rather is mounted on the frame of the etching machine. Generally, the magnetic reaction device is placed at least 0.040 inches away from the surface of the gravure cylinder so as not to interfere with the etching process. Because the spacing between the magnetic reaction device and the surface of the cylinder has to be maintained with a very high degree of accuracy, the cylinder as well as the bearing of the etching maching must be accurately manufactured to avoid mechanical run out.

It is an object of the present invention to provide a method and apparatus for measuring cell volume per unit area after etching or engraving of the gravure printing surface is completed.

It is a further object of the present invention to provide an apparatus for measuring cell volume per unit area which is located directly on the surface of a gravure cylinder.

It is a still further object of the present invention to provide apparatus for accurately locating a magnetic reaction probe relative to the surface of a gravure cylinder.

It is a still further object of the present invention to provide an output signal directly related to the combined cell volumes per area of the etched or engraved patches.

Other objects, aspects, and advantages of the present invention will be apparent when the detailed description is considered with the drawings.

Briefly, the apparatus of the present invention includes a portable support for positioning directly on the surface of the gravure cylinder and a dual magnetic reaction probe which may include series connected Hall devices or pick-up coils, positioned above and in close proximity to an engraved (etched) and non-engraved (non-etched) portion of the surface of the gravure cylinder. An alternating current of suitable frequency 4,000 to 50,000 Hz is passed through a magnetizing coil within the probe to produce an alternating magnetic field. This field is weakened by eddy currents which are produced in the gravure cylinder (non-ferrous metal) by the induction between the coil and the surface of the cylinder. The Hall device positioned over the unengraved area of the cylinder is subjected to a maximum reduction in the field strength by eddy currents. The Hall device positioned over the engraved area, e.g., an area where metal has been removed by etching or mechanical engraving, is subjected to a lesser reduction in the field strength. The two magnetic reaction devices are connected in such a manner that the signals of the two magnetic reaction devices opppose each other, so that the resulting output signal provides a measure of the difference in the reduction in field strength and is a direct measure of the volume of metal that has been removed. To avoid stray field effects it is necessary to accurately position the dual magnetic reaction probe close to the gravure cylinder in a repeatable fashion which is achieved by the support apparatus of the present invention.

The present invention is illustrated in the drawings in which:

FIG. 2 is an exploded view of FIG. 1 with parts removed to facilitate description;

FIG. 3 is a block diagram of the dual magnetic reaction probe and associated electrical apparatus.

Figure 1:
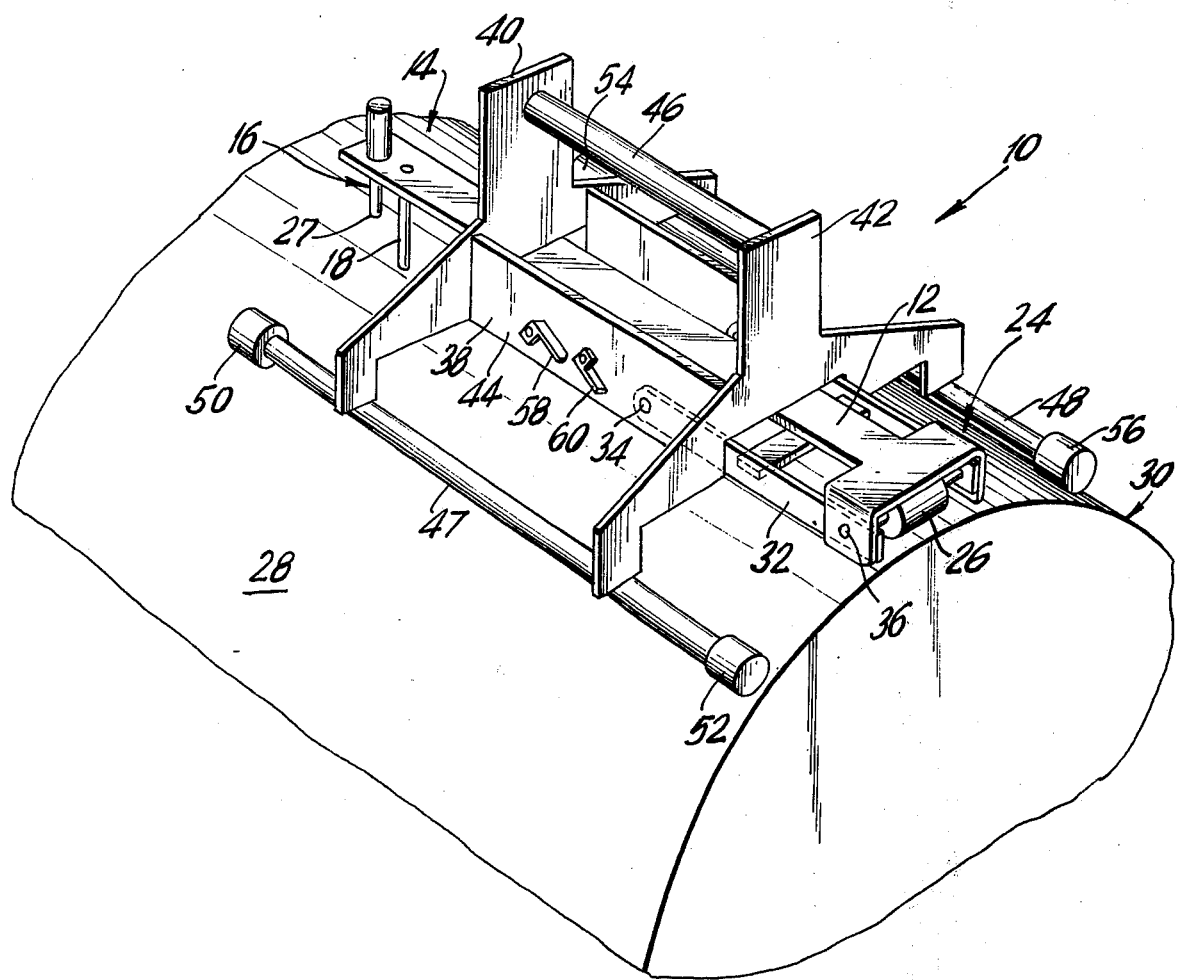
FIG. 1 is a perspective view of the support apparatus of the present invention.

Referring to FIG. 1, the probe support apparatus is generally indicated at 10. The apparatus 10 includes a probe beam 12 having affixed at its one end 14 a dual magnetic reaction probe 16 and a probe positioning member 18.

The probe 16 includes an excitation coil 19, see FIG. 3, having an inside diameter of about ¼ inch with two Hall devices 20 and 22 located inside the coil 19 and spaced about ⅛ inch apart. Such a probe 19 is commercially available from F. W. Bell, Inc., Columbus, Ohio, as Model No. MRP-211.

The opposite or back end 24 of the probe beam 12 includes a back end support 26, e.g., of plastic, mounted thereon via a pivot shaft 36. The probe positioning member 18 and back support 26 are dimensioned to position the probe beam 12 parallel to the cylinder surface and place the bottom end 27 of the probe 16 from about 0.002 to about 0.010 inches above the surface 28 of the gravure cylinder 30.

The back end 24 of the probe beam 12 is connected to the support frame 38 by an I-shaped link 32 which pivots in the support frame 38 about shaft 34 and pivots in the probe beam about shaft 36. This pivoting action permits the back end 24 of the probe beam 12 a sufficient amount of play in the vertical direction, so that the back end support 26 and the probe positioning member 18 will rest on the surface of the gravure cylinder 30, regardless of small deviations in diameter between different gravure cylinders.

The support frame 38 includes a pair of inverted Y-shaped end members 40 and 42, a body member 44, a transverse handle 46 extending between the inverted Y-shaped end members 40 and 42, and a pair of transverse support rods 47 and 48 affixed to opposite sides of the inverted Y-shaped end members 40 and 42. Moreover, the transverse support rods 47 and 48 advantageously include plastic end members 50 and 52, and 54 and 56, respectively, to prevent abrasion of the surface 28 of the gravure cylinder 30. Support rods 47 and 48 ensure that the support frame 38 and by means of the link 32 the probe beam 12 are aligned parallel to the axis of the gravure cylinder 30.

Referring also to FIG. 2, a cam lever 58 and latch lever 60 cooperate with a cam 62 and latch 64, respectively, to properly position the probe 16 and maintain its position adjacent the gravure cylinder 30 as will be more fully explained below.

In operation, the apparatus 10 is manually positioned on the gravure cylinder 30 with the probe beam 12 in the axial direction of the cylinder 30 and the transverse support rods 47 and 48 engaging the surface 28 of the gravure cylinder 30. The probe 16 is initially held away from the surface 28 of the cylinder 30 by the cam 62. The probe beam 12 is held in its "up" position by the cam 62 which is mechanically coupled to an arm 66 having a biasing spring 68 coupling the arm 66 to the body member 44, see FIG. 2. In this position, the cam 62 engages a cam follower or lug 72 affixed to the probe beam 12 to maintain the probe beam 12 in the "up" position and hold the probe 16 away from the surface 28 of the gravure cylinder 30. The apparatus 10 is moved over the surface 28 of the gravure cylinder 30 so that the one of the Hall devices, e.g., 22 in FIG. 3, is located over the engraved area of a control patch and the other Hall device, 20 in FIG. 3, is located over the unengraved area next to the control patch.

Clockwise rotation or depression of the cam lever 58, which is mechanically coupled to the cam 62 and arm 66 through a rotatable shaft 70, will rotate the cam 62 and allow the cam follower 72 to slide along the cam 62 causing a lowering of the probe beam 12 until the probe positioning member 18 engages the surface 28 of the gravure cylinder 30, see FIG. 1. Continued or further depression of the cam lever 58 will cause the arm 66 to engage the latch 64 to maintain the cam 62 and probe beam 12 in the "down" position, preventing the biasing spring 68 from returning the cam 62 and probe 16 to the "up" position when the operator removes his hand. Thus, the operator need not have his hand on the cam lever 58 while measurements are taken.

Depression or clockwise rotation of the latch lever 60, which is mechanically coupled to the latch through a shaft 74, causes the latch 64 to release the arm 66, enabling the force of the spring 68 to rotate the cam 62 to lift the probe beam 12 and probe 16 to its original or "up" position. Likewise, when the apparatus 10 is removed from the surface 28 of the gravure cylinder 30, the link 32 will pivot downwardly (clockwise) with respect to the support frame 38 about pivot 34 allowing pullrod 77 inside a latch spring 76, coupling the link 32 to the latch 64, to rotate the latch 64, causing release of the arm 66 and return of the probe 16 to its "up" position. This automatic release feature protects the probe 16 and gravure cylinder 30 from damage in future use.

Referring to FIG. 3, the differential Hall output voltage from the probe 16, after the coil 19 has been energized, is amplified and filtered in a differential magnetic reaction analyzer 78 such as Model 1390 available from F. W. Bell, Inc., Columbus, Ohio. The A.C. signal from the differential magnetic reaction analyzer 78 is further amplified, as desired, by amplifier 80 and is demodulated and filtered in demodulator and filter 82 to yield a D.C. signal proportional to the engraved cell volume of the control patch. With proper instrument calibration and adjustment, a scaling network 84, and a digital meter 86, equivalent engraving volume of the control patch can be read directly from the digital meter 86. A digital recorder 88 may be used, as desired, to provide a permanent record of the measurement.

It should be understood by those skilled in the art that various modifications may be made in the present invention without departing from the spirit and scope thereof as described in the specification and defined in the appended claims.

What is claimed is:

1. An apparatus for measuring the volume of gravure printing cells which is positioned directly on a gravure printing surface comprising:
   a frame;
   engaging means coupled to said frame for engagement with the gravure printing surface;
   a probe beam movable coupled to said frame;
   back end support means mounted on said probe beam for contacting the gravure printing surface;
   a magnetic reaction probe mounted on said probe beam;
   a probe positioning member coupled to said probe beam; and
   means for lowering said probe beam so that said probe positioning member engages the gravure printing surface and said magnetic reaction probe is positioned a predetermined distance from the gravure printing surface.

2. The apparatus recited in claim 1 including:
   means for locking said probe beam in its lowered position.

3. The apparatus recited in claim 2 including:
   link means pivotally coupling said frame and said probe beam and coupled to said locking means to release said locking means and return said probe beam to its up position upon removal of the apparatus from the gravure printing surface.

4. The apparatus recited in claim 1 wherein:
   said engaging means and said back end support means include plastic surfaces for engagement with the gravure printing surface.

5. The apparatus as recited in claim 1 wherein:
   the gravure printing surface is in the form of a cylinder.

6. The apparatus recited in claim 1 wherein:
   said lowering means includes a cam lever, a cam, biasing means, and a shaft mechanically coupling said cam lever and said cam, said cam engaging a cam follower affixed to said probe beam.

7. The apparatus recited in claim 2 wherein:
   said locking means includes a latch lever, a latch and a shaft mechanically coupling said latch lever and said latch, said latch being capable of engaging an arm coupled to said lowering means to prevent raising of said probe beam when said probe positioning member is in engagement with the gravure printing surface.

8. The apparatus recited in claim 7 including:
   a link means mechanically coupled to said latch to rotate said latch and release said arm from engagement with said latch when said link means pivots upon removal of the apparatus from the gravure printing surface.

9. The apparatus recited in claim 1 wherein:
   said magnetic reaction probe includes an excitation coil and a pair of magnetic reaction devices.

10. The apparatus recited in claim 1 wherein:
    said probe positioning member is dimensioned to position said magnetic reaction probe from about 0.002 to about 0.010 inches above the surface of the gravure printing surface when said probe positioning member engages the gravure printing surface.

11. An apparatus for measuring the volume of gravure printing cells which is positioned directly on a gravure cylinder, comprising:
    a frame;
    a pair of transverse members coupled to said frame for engagement with the surface of the gravure cylinder;
    a probe beam movably coupled to said frame;
    a magnetic reaction probe mounted on one end of said probe beam, said magnetic reaction probe including an excitation coil and a pair of Hall devices;
    a probe positioning member coupled to said one end of said probe beam adjacent said magnetic reaction probe, said probe positioning member being dimensioned to position said magnetic reaction probe from about 0.002 to about 0.010 inches above the surface of the gravure cylinder when said probe positioning member engages the surface of the gravure cylinder;
    probe beam supporting means coupled to said probe beam for engagement with the surface of the gravure cylinder;
    means for lowering said probe beam so that said probe positioning member engates the surface of the gravure cylinder, said lowering means including a cam lever, a cam, biasing means, and a shaft mechanically coupling said cam lever and said cam, said cam engaging a cam follower affixed to said probe beam;
    means for locking said probe beam in its lowered position, said locking means including a latch lever, a latch, and a shaft mechanically coupling said latch lever and said latch; and
    link means pivotally mounted on said frame and said probe beam, said link means being mechanically coupled to said latch of said locking means to release said locking means and return said probe beam to its up position upon removal of the apparatus from the surface of the gravure cylinder.

12. An apparatus for measuring the volume of gravure printing cells which is positioned directly on a gravure printing surface, comprising:
    a frame;
    engaging means coupled to said frame for engagement with the gravure printing surface;
    a movable probe support coupled to said frame;
    a magnetic reaction probe coupled to said movable probe support;
    probe positioning means for contacting the gravure printing surface and maintaining a predetermined spaced relationship between the magnetic reaction probe and the gravure printing surface; and
    lever means coupled to said movable probe support for lowering said magnetic reaction probe to a fixed spaced position relative to the gravure printing surface, which fixed spaced position is determined by contact of said probe positioning means with the gravure printing surface when said magnetic reaction probe is lowered.

13. The apparatus recited in claim 12, wherein:
said magnetic reaction probe includes an excitation coil and a pair of magnetic reaction devices.

14. The apparatus recited in claim 12, including:
lock means for locking said magnetic reaction probe in its lowered position.

15. The apparatus recited in claim 12, wherein: the gravure printing surface is a gravure cylinder.

16. The apparatus recited in claim 12, wherein:
said probe positioning means is dimensioned to position said magnetic reaction probe from about 0.002 to about 0.010 inches above the gravure printing surface when said probe positioning member engages the gravure printing surface.

* * * * *